US008518160B2

United States Patent
Mann

(10) Patent No.: US 8,518,160 B2
(45) Date of Patent: Aug. 27, 2013

(54) TURBINE INLET HEAT TRANSFER SYSTEM

(75) Inventor: Richard M. A. Mann, Alton (GB)

(73) Assignee: General Electric Company, Schenectady, NY (US)

( * ) Notice: Subject to any disclaimer, the term of this patent is extended or adjusted under 35 U.S.C. 154(b) by 782 days.

(21) Appl. No.: 12/761,785

(22) Filed: Apr. 16, 2010

(65) Prior Publication Data

US 2011/0252763 A1    Oct. 20, 2011

(51) Int. Cl.
*B01D 46/00* (2006.01)
*F02C 7/04* (2006.01)

(52) U.S. Cl.
USPC ........ 95/273; 55/341.11; 55/385.1; 55/482.1; 60/39.092; 95/283; 165/200

(58) Field of Classification Search
USPC .. 55/341.1, 482.1, 341.11, 385.1; 60/39.092; 165/47, 200, 201
See application file for complete search history.

(56) References Cited

U.S. PATENT DOCUMENTS

| 4,851,162 A | 7/1989 | Sperr, Jr. et al. | |
| 8,266,910 B2* | 9/2012 | Feher et al. | 60/728 |

* cited by examiner

*Primary Examiner* — Robert Clemente
(74) *Attorney, Agent, or Firm* — Armstrong Teasdale LLP

(57) ABSTRACT

A heat transfer system is provided for a filter house. The filter house is configured to channel air into a turbine engine. The heat transfer system includes at least one of an expansion device and a compressor, a circuit coupled to at least one of the expansion device and the compressor, at least one sensor that detects a parameter of at least one of air channeled through a filter house and the fluid channeled through the circuit, and a controller coupled to the at least one sensor. The controller is configured to selectively control flow of fluid through the circuit to change the parameter of air channeled through the filter house based on the parameter detected by the sensor.

18 Claims, 5 Drawing Sheets

TURBINE INLET HEAT TRANSFER SYSTEM

BACKGROUND OF THE INVENTION

The subject matter disclosed herein relates generally to turbine engines and, more particularly, to a heat transfer system for use with a turbine inlet.

At least some known turbine engines channel ambient air through a filter house to a core engine. The air is compressed within the core engine and is mixed with fuel prior to being ignited to generate combustion gases. Performance and/or operating efficiencies of known turbine engines may vary depending on a quality of air channeled through the filter house to the core engine. For example, one such quality is temperature. Generally, cooler air has a propensity to freeze moisture that is conducted to the turbine engine, which may adversely impact engine performance and efficiency by disrupting air flow, increase a drop in air pressure, and/or potentially damage engine components. Conversely, warmer air has a relatively low air density and, thus, channels less oxygen through the turbine engine. Operating with reduced oxygen levels may adversely impact engine performance and efficiency by making it more difficult to achieve clean, efficient combustion.

BRIEF DESCRIPTION OF THE INVENTION

In one aspect, a method is provided for regulating air channeled through a filter house. The method includes coupling a heat transfer system to the filter house. A parameter of at least one of air channeled through the filter house and a fluid channeled through a circuit coupled to at least one of an expansion device and a compressor is detected. A fluid flow is determined based on the parameter. The fluid flow includes at least one of a first direction to heat the fluid and a second direction to cool the fluid. The flow of fluid through the circuit is controlled to change the parameter of air channeled through the filter house.

In another aspect, a heat transfer system is provided for a filter house. The heat transfer system includes at least one of an expansion device and a compressor, a circuit coupled to at least one of the expansion device and the compressor, at least one sensor that detects a parameter of at least one of air channeled through a filter house and the fluid channeled through the circuit, and a controller coupled to the at least one sensor. The controller is configured to selectively control flow of fluid through the circuit to change the parameter of air channeled through the filter house based on the parameter detected by the sensor.

In yet another aspect, a turbine engine system includes a turbine engine, a filter house configured to channel air into the turbine engine, and a heat transfer system coupled to the filter house. The heat transfer system includes at least one of an expansion device and a compressor, a circuit coupled to at least one of the expansion device and the compressor, at least one sensor that detects a parameter of at least one of air channeled through a filter house and the fluid channeled through the circuit, and a controller coupled to the at least one sensor. The controller is configured to selectively control flow of fluid through the circuit to change the parameter of air channeled through the filter house based on the parameter detected by the sensor.

DETAILED DESCRIPTION OF THE INVENTION

The subject matter described herein relates generally to turbine engines. More particularly, the subject matter described herein relates to a heat transfer system for use with a turbine inlet and, more specifically, for use with a filter house that channels air into a turbine engine. The heat transfer system described herein includes an expansion device, a compressor, a circuit, and a controller. The circuit couples the expansion device to the compressor. The controller enables a fluid to be selectively channeled through the circuit in at least one of a first direction and a second direction integrated within other filter house functional components.

An exemplary technical effect of the methods and systems described herein includes at least one of: (a) detecting a parameter of a fluid; (b) determining a fluid flow based on the parameter; (c) actuating a valve between an open configuration and a closed configuration; and (d) channeling the fluid through a circuit in at least one of a first direction and a second direction.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

Figure 1:
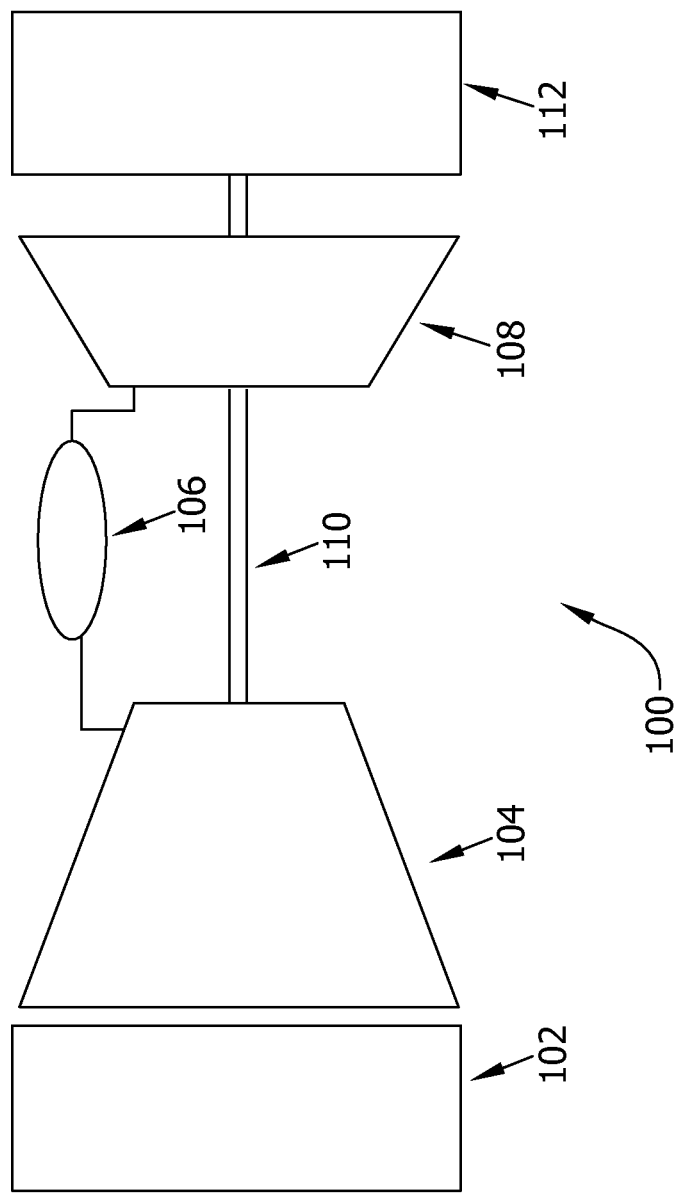
FIG. 1 is a schematic illustration of an exemplary known gas turbine engine system.

FIG. 1 is a schematic illustration of an exemplary gas turbine engine system 100. In the exemplary embodiment, gas turbine engine system 100 includes, coupled in serial flow arrangement, a filter house 102, a compressor 104, a combustor assembly 106, and a turbine 108 that is rotatably coupled to compressor 104 via a rotor shaft 110.

During operation, in the exemplary embodiment, ambient air is drawn into filter house 102, wherein the ambient air is filtered. In the exemplary embodiment, the filtered air is channeled through an air inlet (shown in FIG. 2) towards compressor 104. The filtered air is then compressed prior to being directed towards combustor assembly 106. In the exemplary embodiment, compressed air within combustor assembly 106 is mixed with fuel, and the resulting fuel-air mixture is then ignited within combustor assembly 106 to generate combustion gases that are directed towards turbine 108. In the exemplary embodiment, turbine 108 extracts rotational energy from the combustion gases and rotates rotor shaft 110 to drive compressor 104. Moreover, in the exemplary embodiment, gas turbine engine system 100 drives a load 112, such as a generator, coupled to rotor shaft 110.

Figure 2:
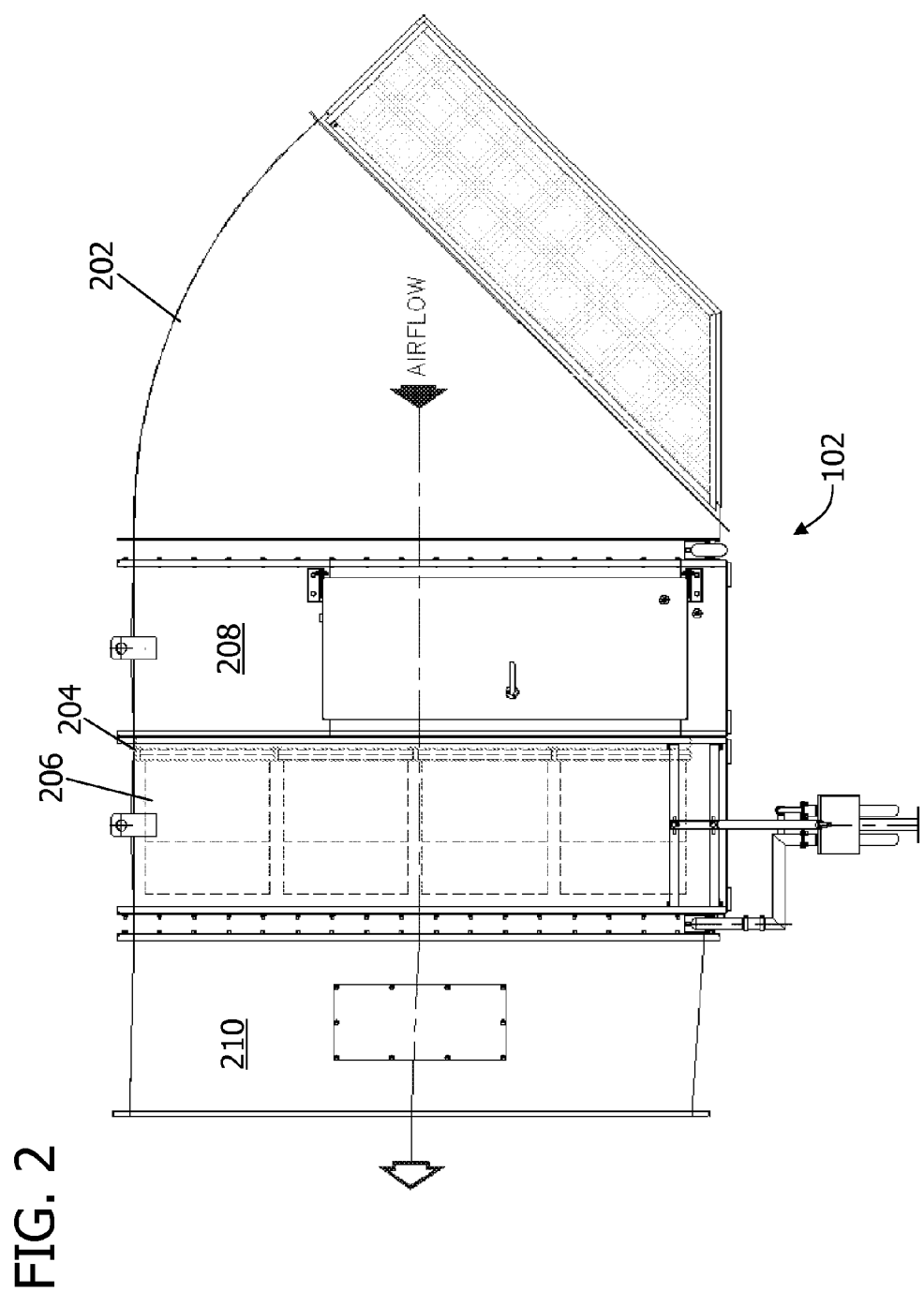
FIG. 2 is a cross-sectional illustration of an exemplary filter house that may be used with the turbine engine shown in FIG. 1.

FIG. 2 is a cross-sectional illustration of filter house 102. In the exemplary embodiment, filter house 102 is a static filter house including an inlet hood 202 that receives ambient air into filter house 102. Inlet hood 202 may include an insect screen (not numbered) and a pre-filter assembly (not shown) that separates at least some moisture, dust, and/or debris from air flow channeled through inlet hood 202. In the exemplary embodiment, filter house 102 includes a filter holding frame 204 that retains a filter 206 within filter house 102, an air filter chamber 208 that is upstream from filter 206 and a clean air chamber 210 that is downstream from filter 206.

During operation, in the exemplary embodiment, ambient air is channeled through inlet hoods 202 into filter house 102. In the exemplary embodiment, pre-filter assembly and/or filter 206 removes at least some dust and/or debris carried by air channeled through air filter chamber 208. Filtered air is channeled downstream from air filter chamber 208 through filter 206 into clean air chamber 210 prior to being channeled to compressor 104 (shown in FIG. 1).

Figure 3:
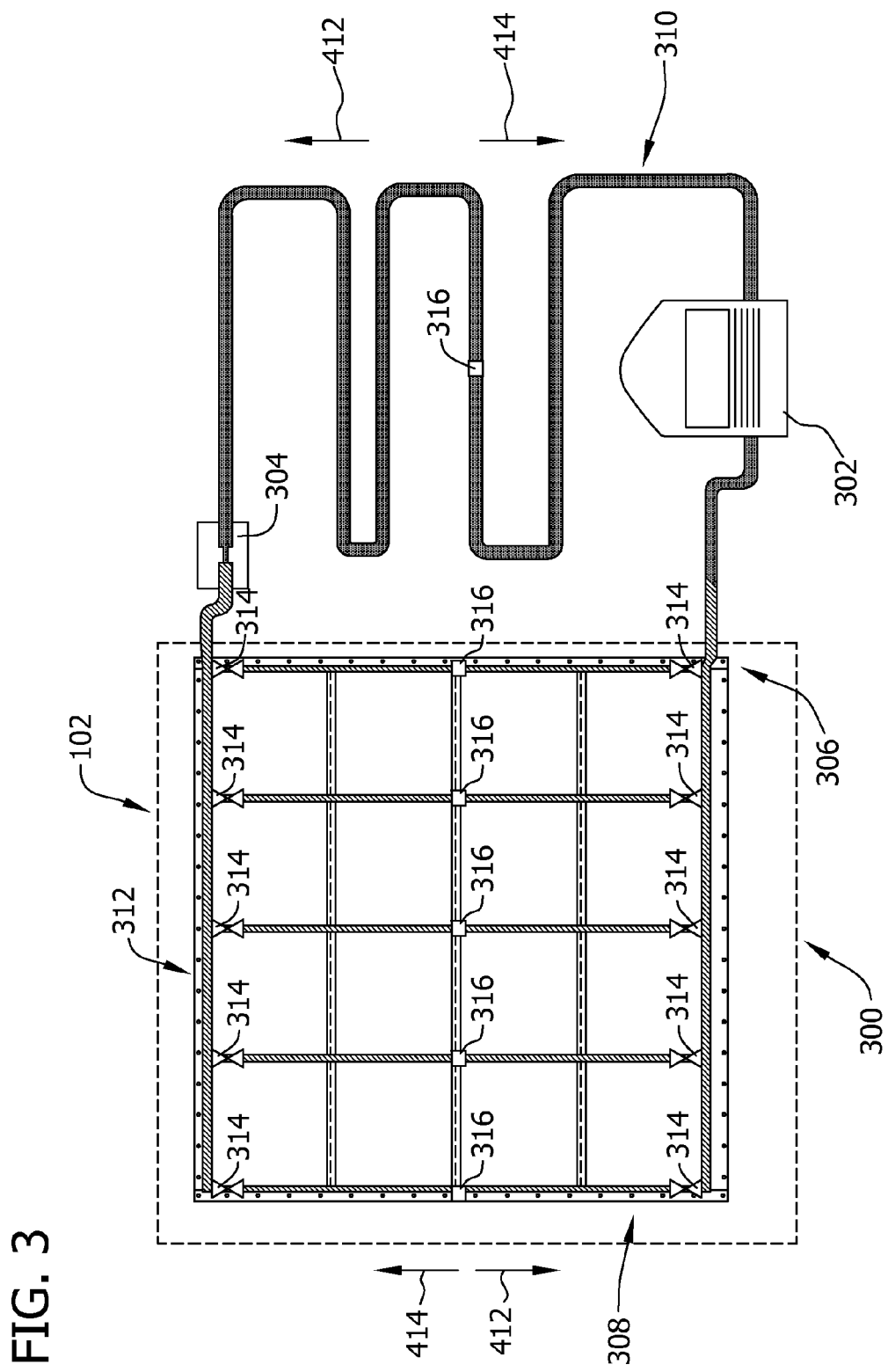
FIG. 3 is a schematic illustration of a heat transfer system that may be used with the filter house shown in FIG. 2.

FIG. 3 is a schematic illustration of an exemplary heat transfer system 300 for use in regulating a temperature of air channeled through filter house 102. In the exemplary embodiment, heat transfer system 300 is coupled to filter holding frame 204. Alternatively, heat transfer system 300 may be coupled to any suitable component of filter house 102 that enables heat transfer system 300 to operate as described herein. For example, heat transfer system 300 may be integrally formed with any filter house component that is positioned within an air flow channeled through filter house 102. In one embodiment, heat transfer system 300 is coupled to a functional filter house component such as, but not limited to, a silencer, a drift eliminator, and/or a tube sheet. The temperature of air channeled through filter house 102 is regulated by channeling air flow proximate at least a portion of heat transfer system 300. Accordingly, heat transfer system 300 facilitates channeling a fluid flow across filter house 102 to enable heating and/or cooling the air flow channeled through filter house 102.

Heat transfer system 300 includes a compressor 302 and an expansion device 304. Compressor 302 and/or expansion device 304 facilitate controlling a pressure, a temperature, and/or a direction of a fluid, such as a refrigerant, channeled through a circuit 306. In one embodiment, a single component serves as compressor 302 and expansion valve 304, depending on which direction fluid is channeled through the single component.

Circuit 306 circulates fluid between compressor 302 and expansion device 304. In the exemplary embodiment, circuit 306 includes a first portion 310 that is positioned outside filter house 102 and a second portion 308 that is positioned within filter house 102. In the exemplary embodiment, heat is transferred between first portion 310 and ambient air, and heat is transferred between second portion 308 and air channeled through filter house 102.

In the exemplary embodiment, second portion 308 includes a plurality of pipes 312 that are coupled in a parallel flow orientation. In the exemplary embodiment, second portion 308 includes a plurality of valves 314 that are selectively actuatable between an open configuration and a closed configuration. When valve 314 is in the open configuration, heating and/or cooling fluid flows through pipe 312. When valve 314 is in the closed configuration, fluid does not flow through pipe 312. Valves 314 are configured to selectively control fluid flow through circuit 306 and, more particularly, through at least one parallel pipe 312. More specifically, in the exemplary embodiment, each parallel pipe 312 is coupled to a respective valve 314 that controls a fluid flow through that respective parallel pipe 312.

At least one sensor 316 monitors operation of heat transfer system 300 by detecting and/or sensing at least one operating parameter. In the exemplary embodiment, sensor 316 is coupled to heat transfer system 300. More specifically, in the exemplary embodiment, sensor 316 is coupled to filter house 102 and/or circuit 306 for sensing at least one of a temperature of ambient air, a temperature of air channeled through filter house 102, and/or a temperature of fluid channeled through circuit 306. It will be apparent that sensor 316 may be located anywhere in filter house 102. As used herein, the term "parameter" refers to a physical property whose value can be used to define an operating condition of heat transfer system 300, such as a temperature, a pressure, a humidity, and/or an air speed at a defined location.

Figure 4:
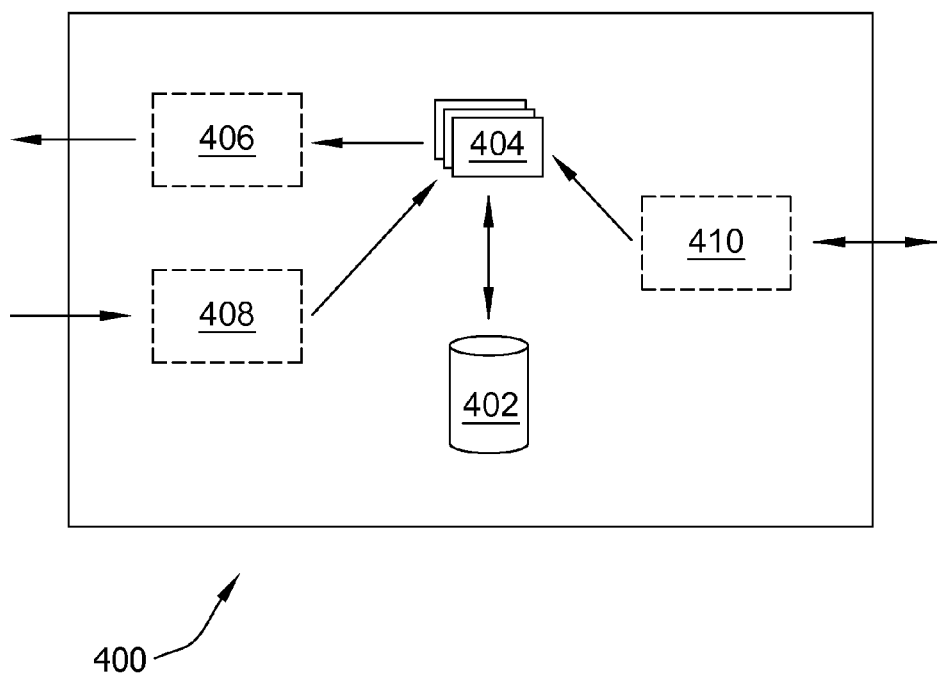
FIG. 4 is a schematic illustration of an exemplary controller that may be used with the heat transfer system shown in FIG. 3.

FIG. 4 is a schematic illustration of an exemplary controller 400 that may be used with heat transfer system 300. Controller 400 is communicatively coupled to compressor 302, expansion device 304, valve 314, and/or sensor 316. In the exemplary embodiment, controller 400 includes a memory device 402 and a processor 404 coupled to memory device 402 for executing instructions. In some embodiments, executable instructions are stored in memory device 402. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits.

In the exemplary embodiment, controller 400 is configurable to perform one or more operations described herein by programming processor 404. For example, processor 404 may be programmed by encoding an operation as one or more executable instructions and by providing the executable instructions in memory device 402. Processor 404 may include one or more processing units (e.g., in a multi-core configuration).

In the exemplary embodiment, memory device 402 includes one or more devices that enable information such as executable instructions and/or other data to be stored and retrieved. For example, memory device 402 may include one or more computer readable media, such as, without limitation, dynamic random access memory (DRAM), static random access memory (SRAM), a solid state disk, and/or a hard disk. Moreover, memory device 402 may be configured to store, without limitation, executable instructions and/or any other type of data.

In some embodiments, controller 400 includes a presentation interface 406 coupled to processor 404 to enable information to be presented to a user. For example, presentation interface 406 may include a display adapter (not shown) that is coupleable to a display device (not shown), such as a cathode ray tube (CRT), a liquid crystal display (LCD), an organic LED (OLED) display, and/or an "electronic ink" display. In some embodiments, presentation interface 406 includes one or more display devices. In addition to, or in the alternative, presentation interface 406 may be coupled to, or include, a printer.

In some embodiments, controller 400 includes an input interface 408 that receives input from a user. For example, input interface 408 may receive any information suitable for use with the methods described herein. Input interface 408 is coupled to processor 404 and may include, for example, a keyboard, a pointing device, a mouse, a stylus, a touch sensitive panel (e.g., a touch pad or a touch screen), and/or a position detector. It should be noted that a single component, for example, a touch screen, may function as both a display device of presentation interface 406 and input interface 408.

In the exemplary embodiment, controller 400 includes a communication interface 410 coupled to processor 404. Communication interface 410 communicates with a remote device, such as compressor 302, expansion device 304, valve 314, sensor 316, and/or another controller 400. For example, communication interface 410 may include, without limitation, a wired network adapter, a wireless network adapter, and/or a mobile telecommunications adapter. Alternatively, or in addition, controller 400 is coupled to compressor 302, expansion device 304, valve 314, sensor 316, and/or another controller 400 via a network (not shown). The network may include, without limitation, the Internet, a local area network (LAN), a wide area network (WAN), a wireless LAN (WLAN), a mesh network, and/or a virtual private network (VPN) or other suitable communication means. Controller 400 is electrically connected directly to, and/or is formed integrally with, compressor 302, expansion device 304, valve 314, and/or sensor 316.

In the exemplary embodiment, controller 400 directs heat transfer system 300 to selectively channel the fluid in a first direction 412 or in a second direction 414. In the exemplary embodiment, flow in first direction 412 enters a cooling cycle, and flow in second direction 414 enters a heating cycle. More specifically, when flow is in first direction 412, fluid is channeled through filter house 102 to compressor 302, wherein the fluid is compressed to a higher pressure and to a higher temperature. The high-pressure, high-temperature fluid is discharged from compressor 302 through first portion 310, wherein the fluid is condensed while at the high temperature. The condensed fluid is then channeled through first portion 310 to expansion device 304, wherein the fluid is adiabatically expanded to produce a low-pressure, low-temperature fluid that is suitable for cooling air channeled through filter house 102. The low-pressure, low-temperature fluid is channeled through second portion 308, wherein heat is transferred from filter house 102 to the fluid, and the cooling cycle repeats.

Conversely, when flow is in second direction 414, the fluid is channeled through filter house 102 to expansion device 304, wherein the fluid is expanded to reduce its pressure and temperature. The low-pressure, low-temperature fluid is discharged from expansion device 304 through first portion 310, wherein the fluid is evaporated to a lower-pressure. The expanded fluid is then channeled through first portion 310 to compressor 302, wherein the fluid is compressed to a high-pressure, high-temperature fluid that is suitable for use in heating air channeled through filter house 102. The high-pressure, high-temperature fluid is channeled through second portion 308, wherein heat is transferred from the fluid to filter house 102, and the heating cycle is repeated.

Figure 5:
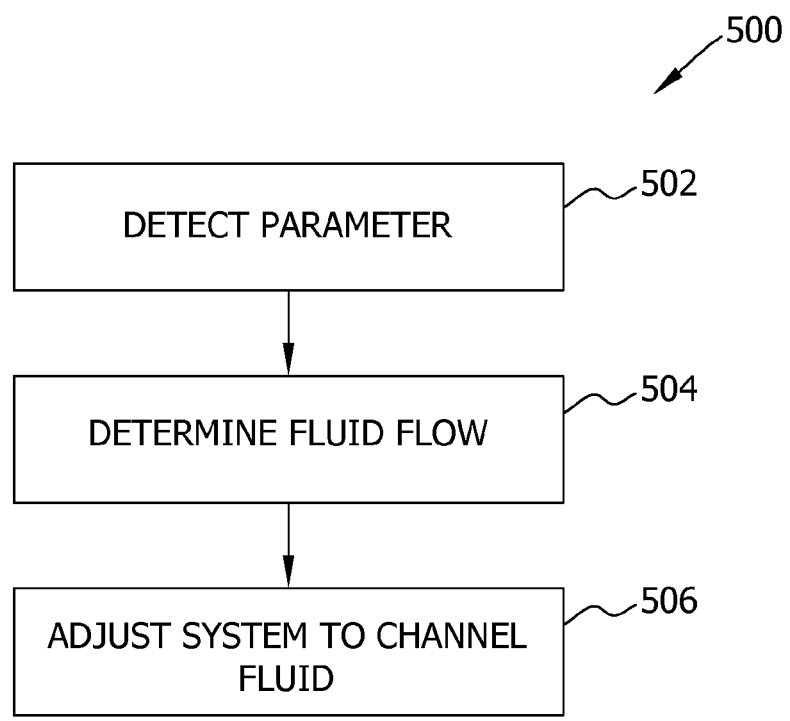
FIG. 5 is a flow chart illustrating an exemplary method for regulating airflow channeled through the filter house shown in FIG. 2.

FIG. 5 illustrates a flow chart of an exemplary method 500 for regulating air channeled through filter house 102. In the exemplary embodiment, controller 400 executes programs based on input from sensor 316 and/or instructions from a user. For example, programs executed by controller 400 may include, for example, programs used to determine a configuration of heat transfer system 300. In the exemplary embodiment, commands generated by controller 400 can cause sensor 316 to monitor at least one parameter and/or to activate other control settings of heat transfer system 300.

During operation, in the exemplary embodiment, sensor 316 detects 502 a parameter of air channeled through filter house 102 and/or fluid channeled through circuit 306. Based on the detected parameter, in the exemplary embodiment, controller 400 determines 504 a fluid flow of fluid channeled through circuit 306. More specifically, in the exemplary embodiment, controller 400 determines whether the fluid is channeled in first direction 412 or second direction 414. For example, when sensor 316 detects that the air channeled through filter house 102 has a temperature above a predetermined threshold, sensor 316 transmits a signal to controller 400 indicative of the temperature of the warm air. Controller 400 then directs heat transfer system 300 to channel fluid in first direction 412 to facilitate cooling the air channeled to turbine engine system 100. In contrast, when sensor 316 detects that the air channeled through filter house 102 has a temperature below a predetermined threshold, sensor 316 transmits a signal to controller 400 indicative of the temperature of the cool air. Controller 400 directs heat transfer system 300 to channel fluid in second direction 414 to facilitate heating the air channeled to turbine engine system 100.

To facilitate channeling fluid in first direction 412 and/or second direction 414, compressor 302, expansion device 304, and/or valves 314 may be selectively adjusted 506 to direct a fluid flow of the fluid channeled through circuit 306. Additionally, valves 314 may be further adjusted to facilitate a substantially even fluid flow through multiple pipes 312. For example, a distal valve 314 may be opened more than a proximal valve 314 to facilitate channeling a substantially equal amount of fluid flow through a pair of pipes 312.

The exemplary methods and systems facilitate regulating air channeled through a filter house. For example, the methods and systems described herein selectively transferring heat between a heat transfer system and air channeled into a turbine engine. The fluid channeled through the heat transfer system is selectively heated and/or cooled to facilitate heating and/or cooling air channeled into a turbine engine, thereby increasing an operating efficiency of the turbine engine.

Exemplary embodiments of methods and systems are described and/or illustrated herein in detail. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for regulating air channeled through a filter house, said method comprising:
    coupling a heat transfer system to the filter house;
    detecting a parameter of at least one of air channeled through the filter house and a fluid channeled through a circuit coupled to at least one of an expansion device and a compressor;
    determining fluid flow of the fluid channeled through the circuit based on the parameter, wherein the fluid flow is in at least one of a first direction to heat the fluid and a second direction to cool the fluid; and
    controlling flow of fluid through the circuit to change the parameter of air channeled through the filter house.

2. A method in accordance with claim 1, wherein channeling the fluid further comprises channeling the fluid through the filter house, wherein the heat transfer system is integrated within a component of the filter house.

3. A method in accordance with claim 1 further comprising selectively actuating a valve coupled to the circuit between an open configuration and a closed configuration.

4. A method in accordance with claim 1, further comprising coupling a plurality of pipes to the circuit, wherein the plurality of pipes are oriented in a parallel configuration.

5. A method in accordance with claim 4, wherein determining a fluid flow further comprises determining a fluid flow through each of the plurality of pipes.

6. A method in accordance with 5 further comprising selectively controlling the fluid flow through each of the plurality of pipes.

7. A heat transfer system for a filter house, said heat transfer system comprising:
   at least one of an expansion device and a compressor;
   a circuit coupled to at least one of said expansion device and said compressor;
   at least one sensor that detects a parameter of at least one of air channeled through a filter house and the fluid channeled through said circuit; and
   a controller coupled to said at least one sensor, said controller configured to selectively control flow of fluid through said circuit to change the parameter of air channeled through the filter house based on the parameter detected by said sensor.

8. A heat transfer system in accordance with claim 7, wherein said circuit channels the fluid through the filter house, wherein said heat transfer system is integrated within a component of the filter house.

9. A heat transfer system in accordance with claim 7 further comprising at least one valve coupled to said circuit, said at least one valve is selectively actuatable between an open configuration and a closed configuration.

10. A heat transfer system in accordance with claim 7, wherein said circuit comprises a plurality of pipes oriented in a parallel configuration.

11. A heat transfer system in accordance with claim 10, wherein said plurality of pipes channel fluid through the filter house.

12. A heat transfer system in accordance with claim 10, wherein each of said plurality of pipes is coupled to a valve that is configured to selectively control fluid flow through said respective pipe.

13. A turbine engine system comprising:
   a turbine engine;
   a filter house configured to channel air into said turbine engine; and
   a heat transfer system coupled to said filter house, said heat transfer system comprising at least one of an expansion device and a compressor, a circuit coupled to at least one of said expansion device and said compressor, at least one sensor that detects a parameter of at least one of air channeled through a filter house and the fluid channeled through said circuit, and a controller coupled to said at least one sensor, said controller configured to selectively control flow of fluid through said circuit to change the parameter of air channeled through the filter house based on the parameter detected by said sensor.

14. A turbine system in accordance with claim 13, wherein said circuit channels the fluid through said filter house, wherein said heat transfer system is integrated within a component of said filter house.

15. A turbine system in accordance with claim 13 further comprising at least one valve coupled to said circuit, said at least one valve is selectively actuatable between an open configuration and a closed configuration.

16. A turbine system in accordance with claim 13, wherein said circuit comprises a plurality of pipes that are oriented in a parallel configuration.

17. A turbine system in accordance with claim 16, wherein said plurality of pipes channel fluid through said filter house.

18. A turbine system in accordance with claim 16, wherein each of said plurality of pipes is coupled to a valve that is configured to selectively control fluid flow through said respective pipe.

* * * * *